United States Patent [19]

Cairo, Jr. et al.

[11] Patent Number: 4,564,457
[45] Date of Patent: Jan. 14, 1986

[54] UPFLOW GAS EDUCTOR INDUCED AIR FLOATATION SEPARATOR

[75] Inventors: John A. Cairo, Jr., Baton Rouge, La.; Christopher A. Jahn, Mission Viejo, Calif.

[73] Assignee: L'eau Claire Systems, Inc., Kenner, La.

[21] Appl. No.: 548,282

[22] Filed: Nov. 3, 1983

[51] Int. Cl.⁴ .................................................. C02F 1/24
[52] U.S. Cl. ...................................... 210/704; 210/709; 210/744; 210/96.1; 210/221.2
[58] Field of Search ................... 210/221.1, 221.2, 703, 210/744, 709, 220, 704, 705, 706, 740, 96.1; 209/164, 168, 170

[56] References Cited

U.S. PATENT DOCUMENTS

| | | | |
|---|---|---|---|
| 3,032,199 | 5/1962 | Somiya | 209/170 |
| 3,784,468 | 1/1974 | Garcia | 210/703 |
| 4,021,347 | 5/1977 | Teller et al. | 210/220 |
| 4,211,733 | 7/1980 | Chang | 261/DIG. 75 |
| 4,220,612 | 9/1980 | Degner et al. | 261/DIG. 75 |
| 4,226,706 | 10/1980 | Degner et al. | 210/221.2 |
| 4,255,262 | 3/1981 | O'Cheskey et al. | 210/221.2 |
| 4,405,456 | 9/1983 | Kinzer et al. | 210/220 |

*Primary Examiner*—Benoit Castel
*Attorney, Agent, or Firm*—Pravel, Gambrell, Hewitt & Kimball

[57] ABSTRACT

An upflow eductor induced air separator providing a main separator tank receiving a continuous fluid flow divided into a plurality of aeration chambers with each aeration chamber providing eductor means wherein gas is educted into an upflow water stream with contaminants of suspended oil and solids in the continuous fluid flow adhering to the gas bubbles for collection in a froth layer on the top portion of the tank. There is further provided a V-shaped collection channel extending substantially the length of the tank for removal of collected oil following the sensing activation of a valve allowing the fluid level within the tank to rise, with oil and solids ladened froth being removed through the valve. There is further provided a recirculation pump for recirculating the effluent which exits the tank following the aeration process, and a chemical injection mechanism for injecting a mixture of chemical flocculating agent entering the main separating tank.

5 Claims, 5 Drawing Figures

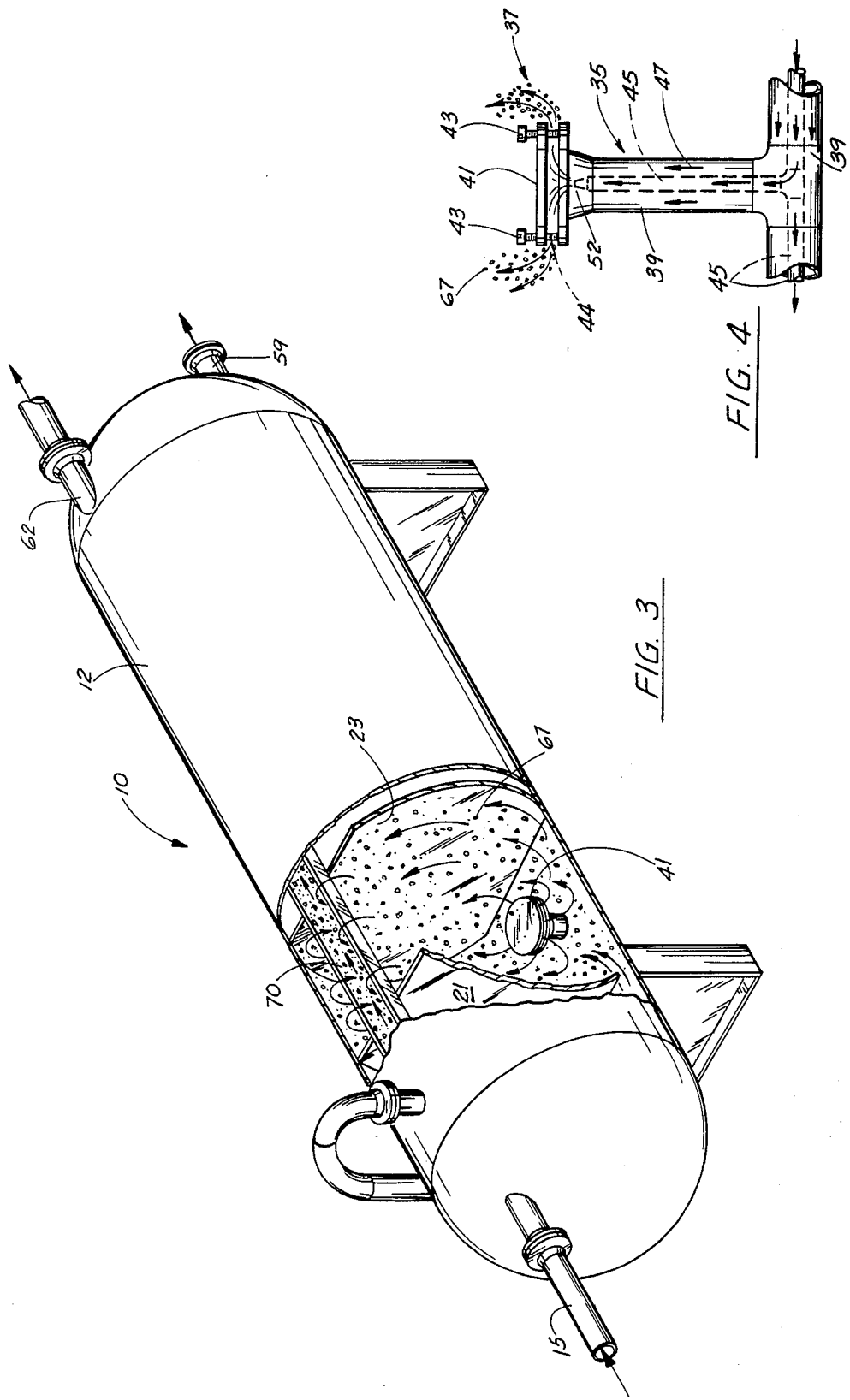

UPFLOW GAS EDUCTOR INDUCED AIR FLOATATION SEPARATOR

BACKGROUND OF THE INVENTION

1. Field of the Invention

The system of the present invention relates to oil/water separators. More particularly, the apparatus of the present invention relates to an oil/water separator wherein a continuous flow of oil and/or suspended particulates ladened water is circulated through a plurality of aeration cells with clean water effluent recirculated to each aeration cell, educting gas into the suspension for floatation and collecting contaminants in a suspended oil ladened froth layer and siphoning off the contaminants during the process.

2. General Background

In many industries, particularly the oil and gas industry, there is an ever present problem of contaminated water as one of the by-products of process. For example, on an oil and gas producing platform, water that has been produced from the well, often is resultantly ladened with oil, and/or suspended solids, therefore, cannot be simply disposed of in the surrounding water, due to the oil and solids contaminants. That being the case, there has been a successive development of apparatuses and systems which attempt to remove oil and solids from the water to a degree that it is relatively safe for return into the surrounding sea.

In the present state of the art, U.S. Filter Corporation manufactures a device which mixes and disburses gas in the form of fine bubbles in the body of liquid in a tank for attempting to remove contaminants from flowing water. This apparatus is covered by U.S. Pat. No. 4,255,262, which employs a gas induction from the upper section of the respective tanks downward via a draft tube to the liquid body contained within the tank. The gas induction occurs as a given portion of the liquid portion already contained in the vessel is recirculated back through the individual cells or compartments with a centrifugal pump. The apparatus also utilizes a mechanical skimmer assembly, electrically driven, which serves to remove the impurity ladened froth from above the liquid level section of the tank. Such skimmers are moderate to high maintenance components of a separation system particularly in such corrosive environments as the oil producing and chemical plant industry.

Another shortcoming of the system under '262 patent are the rectangular-shaped tanks which cannot, by virtue of their construction, withstand pressures in excess of 2 ounces per square inch internal. This is a particular disadvantage especially where system pressure upstream of the oil/water separator are prevalent or where noxious or lethal gases such as hydrogen sulfide are present. Also, the retangular tanks having the skimmers are limited in volumetric capacity merely because full utilization of the tank is not allowed. Construction costs for this particular style tank is relatively high due to bending and welding required to shape the tank to the rectangular configuration. Although such tanks are described as "gas tight," gas pressures are maintained by continuously venting the gas to atmosphere, therefore not truly being "gas tight."

Other patents which were found as a result of a search of the art, but may not be particularly relevant are as follows:

U.S. Pat. No. 2,274,658 issued to R. B. Booth
U.S. Pat. No. 2,782,929 issued to W. W. Colket
U.S. Pat. No. 3,468,421 issued to B. S. Hazel, et al
U.S. Pat. No. 1,648,558 issued to J. R. Mesten, et al
U.S. Pat. No. 1,612,557 issued to E. C. Wiseburger
U.S. Pat. No. 911,314 issued to H. F. Maryville
U.S. Pat. No. 2,825,422 issued to O. B. Showenfeld
U.S. Pat. No. 4,305,819 issued to Kobozev, et al
U.S. Pat. No. 2,942,733 issued to H. A. Thompson
U.S. Pat. No. 2,179,131 issued to R. B. Miller
U.S. Pat. No. 4,102,787 issued to A. A. Gersten
U.S. Pat. No. 4,147,629 issued to A. A. Gersten
U.S. Pat. No. 4,111,806 issued to Wright, et al

SUMMARY OF THE PRESENT INVENTION

The apparatus and system of the present invention solves the problems confronted in the present state of the art in a simple and straightforward manner. What is provided is an upflow eductor induced air or gas separator providing a main separator tank receiving a continuous fluid flow divided into a plurality of aeration chambers with each aeration chamber providing eductor means wherein gas is educted into an upflow water stream with contaminats of suspended oil and solids in the continuous fluid flow adhering to the gas bubbles for collection in a froth layer on the top portion of the tank. There is further provided a V-shaped collection channel extending substantially the length of the tank for removal of collected oil following the sensing activation of a valve allowing the fluid level within the tank to rise, with oil and solid ladened froth being removed through the valve. There is further provided a recirculation pump for recirculating the effluent which exits the tank following the aeration process, and a chemical injection mechanism for injecting a mixture of chemical flocculating agent entering the main separating tank.

A primary tank would be cylindrical in shape, void of sideboard mechanical oil froth skimmers, therefore allowing maximum volumetric utilization of the area provided for in the tank. Vessels of this design can be fabricated to ASME code standards, if desired, and built to withstand virtually any inlet pressure common to applications found in the water clarification field. Vessels of this design are truly gas-tight and truly gas-tight vessels minimize if not totally prevent the leakage of noxious and/or lethal gases thereby greatly minimizing the chances for personal injury which may be caused by explosion and/or asphixiation. Additionally, inlet pressure surges within the rated design pressure are not detrimental to the performance of the system. In fact, such inlet pressure surges serve as a "Super Charger", which will actually enhance the eductor/aeration performance.

Therefore, it is an object of the present invention to provide an upflow gas eductor induced air floatation separator in a continuous stream.

It is a further object of the present invention to provide an eductor induced air separator which collects oil and gas contaminants within a top area of a tank for removal therefrom;

It is still a further object of the present invention to provide an upflow gas eductor induced air separator which utilizes the combination of primary fluid flow through a plurality of aeration chambers while simultaneously educting air or gas ladened effluent in an upflow mode through the primary flow for collection of the oil contaminants;

It is still a further object to provide for a method to remove collected contaminants without the use of mechanical devices such as sideboard paddle wheel type, motor driven skimmer mechanism.

It is still a further object of the present invention to provide an upflow gas separator which is contained in a primary tank and can be pressurized under certain conditions without hazard to property or humans in the surrounding area.

BRIEF DESCRIPTION OF THE DRAWINGS

For a further understanding of the nature and objects of the present invention, reference should be had to the following detailed description, taken in conjunction with the accompanying drawings, in which like parts are given like referenced numerals and, wherein:

FIG. 3 illustrates a partial perspective cut-away view of the preferred embodiment of the apparatus of the present invention; and FIG. 4 illustrates a cross-sectional view of the gas eductor means of the present invention.

DETAILED DESCRIPTION OF THE PREFERRED EMBODIMENT

The preferred embodiment of the apparatus of the present invention is illustrated in the FIGS. 1 through 4 by the numeral 10. As seen in the FIGURES, particularly FIGS. 1 and 3, system 10 comprises main separater tank 12 which is substantially an elongated unitary tank having a continuous side wall and rounded end portions for providing the ability to receive pressurized flow into the tank under certain circumstances.

Figure 1:
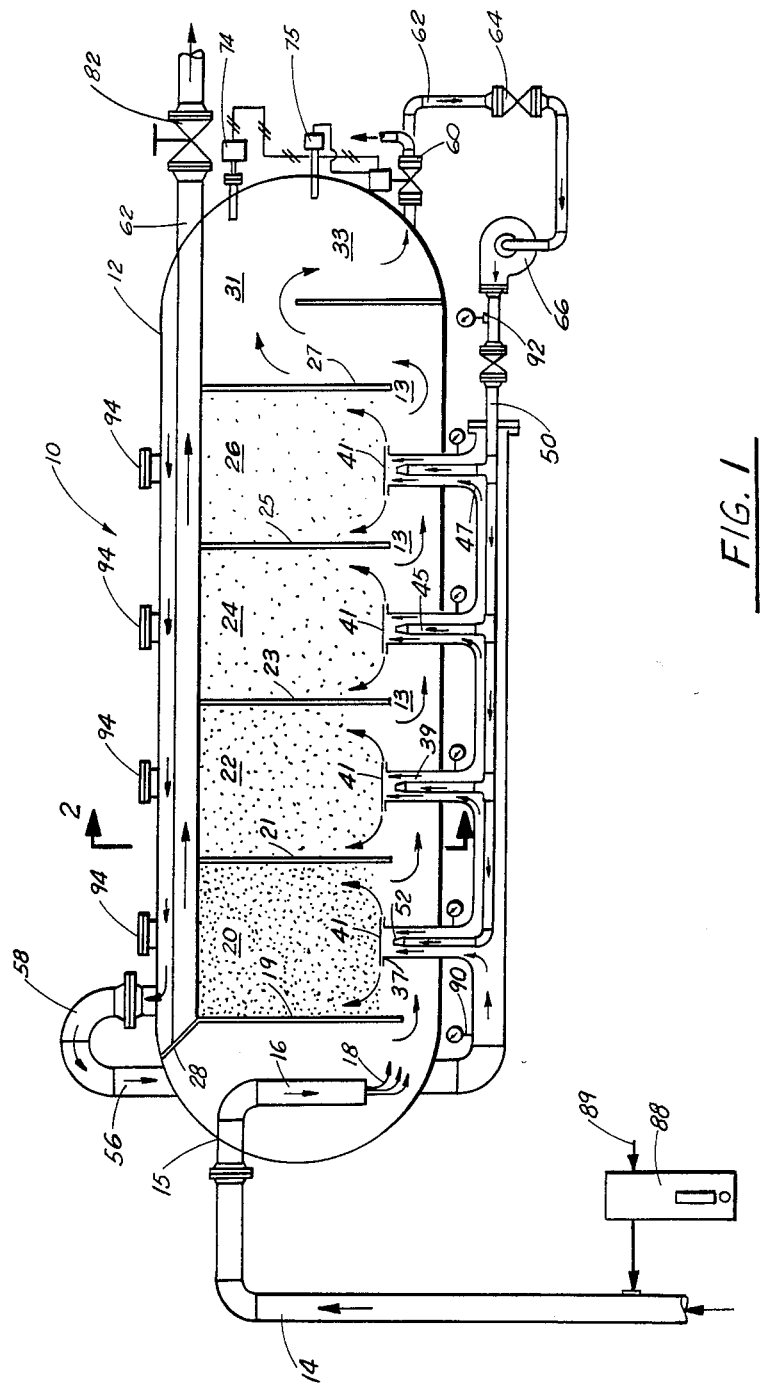
FIG. 1 is an overall cross-sectional side view of the preferred embodiment of the apparatus of the present invention.

As seen in FIG. 1, tank 12, which is utilized as an upflow gas eductor induced air floatation separator tank receives an inflow of oily contaminated water via flow line 14, with flow line 14 entering tank 12 at point 15 at its front end portion and projecting downward as inlet downcomer 16 for the introduction of the inlet fluid flow toward the lower portion 17 of tank 12 as indicated by arrows 18. As seen in FIG. 1, the interior of tank 12 provides a plurality of downward depending bulkhead partitions 19, 21, 23, 25 and 27, substantially equally spaced apart, said downward depending bulkhead partitions defining a plurality of aeration chambers 20, 22, 24 and 26 between each successive pair of partitions. As seen in FIG. 1, bulkhead partition 19 at its upper portion presents an angulated section 28, the function of which will be described further.

As seen in FIGS. 1 and 3, each of said vertically disposed bulkhead partitions extend only partially down the interior of tank 12, allowing a flow area 13 between successive aeration chambers along the lower portion of the tank between the end of each partition and the bottom wall 30 of tank 12. This would allow the continuous lateral primary flow of fluid through tank 12 following the injection of the fluid via downcomer nozzle 16 through the successive aeration chambers to the second back end portion of tank 12. It should be noted at this point that following the flow of fluid past the rearmost partition 27, there is vertically disposed upwardly depending baffle plate 29 which, serves to interrupt the flow out of aeration chamber 26, and enables the flow to flow in the upper region 31 of tank 12 and enter a quiescent zone or chamber 33. This quiescent zone 33 is necessary so that flow out of tank 12 is not ladened with air which could cause cavitation of pump 66 which will be discussed further.

Returning now to each aeration chamber, each chamber is further provided with gas eductor means 35 (See FIG. 4), each gas eductor means 35 projecting into each aeration chamber being identical, and having identical functions. Each eductor means would further comprise a gas header means 37, and would also include a gas flow channel 39 projecting through the bottom wall 30 of tank 12 for allowing gas flow therethrough into each aeration chamber. Gas inlet 39 would further include on its uppermost portion header plate 41 which would be fixedly attached to the top shoulder portion 42 of gas injector 39 via a plurality of spacer bolts 43, providing a gas flow space 44 between injector line 39 and header plate 41 into each of said aeration chambers. As is seen in FIG. 1, there is further provided a secondary fluid flow line 45 contained within the primary gas flow line 35, line 45 being the effluent recirculation line which recirculates fluid under pressure into header means 37 substantially adjacent header plate 41 so that the pressurized flow of fluid out of line 45 at each nozzle 52 educts gas from line 35 (arrows 47) into the fluid flow for achieving the aeration effect of gas bubbles moving upward through each of said aeration chambers during the process. As is further seen in FIG. 1, the source of gas in each of gas header 35 is principally achieved from the entrained gas collected in the top portion 54 of tank 12 during the aeration process, with the flow of gas indicated by arrows 56 being educted into main gas flow line 58 for circulation into header 37 for mixture with fluid flow in fluid line 45. It should be noted that the flow of gas educted by the flow of fluid out of nozzles 52, creates a continuous effect of recirculation of the gas achieved in the aeration process.

As is further seen in FIG. 1, the apparatus would further comprise effluent exit line 59 which would receive the fluid outflow from quiescent chamber 33 during the aeration process. Exit line 59 would flow into valve 60 which would be a controlled valve, the function of which will be described further. Following the flow past valve 60, exit line 59 would then diverge into flow line 63, which would be the principal line for removal of the clean water effluent from the system, and line 62 which would flow into second valve 64 and on into recirculation pump 66 for recirculation back through inflow line 50 for use in the eductor system. Therefore, it is seen that some of the flow which has been through the system is removed therefrom, while a portion of the flow is allowed to be recirculated back into the system.

Figure 2A:
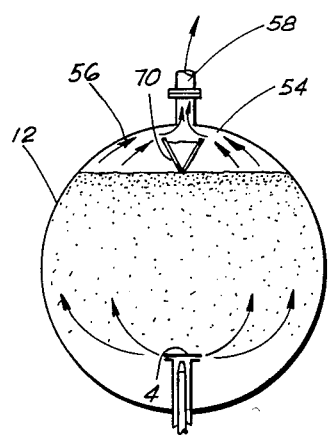
FIGS. 2A and 2B illustrate the end views of the preferred embodiment of the apparatus of the present invention.
Figure 2B:
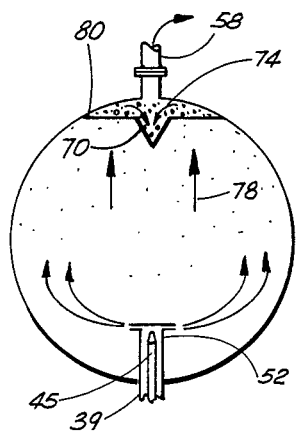

What is one of the principal features of the apparatus is the means for collection and removal of the contaminant ladened froth from the top portion 54 of each aeration chamber of tank 12 during the aeration process, referred to as the "skim mode." FIGS. 2A and 2B in combination with FIGS. 1 and 3, further illustrate in detail the means for collection of this oil ladened froth from the water in order to achieve the final clean water effluent out of the system. As seen in the FIGURES, the top portion of each bulkhead partition provides a means for securing a continuous channel defining a continuius oil collection trough 70, along each aeration chamber which, as seen in the FIGURES in side view, is substantially a V-shaped trough extending from its first end portion at angulated plate 28 which seals it off from the entrance chamber across each bulkhead partition, to the second end portion of the tank emptying through line 62. During the process of collection of this oil ladened froth, gas educted into the fluid flow within headers 37 moves upward through the fluid within each aeration chamber, with the bubbles as indicated by dots 67 within chamber 20 moving upward to the top portion 54 of tank 12. These air bubbles collect oil and/or suspended solids contaminants as they travel up and collect as a contaminant ladened froth to the upper portion 54 of tank 12. As seen in FIG. 2A during this aeration process, the educted gas or air in space 54 as indicated by arrow 56 would continue to flow out of gas line 58 to be re-circulated into header 37. However, as the froth which is the oil and solid ladened contaminants tend to build up in space 54, there is further provided a density probe 74 extruding into the interior upper portion of tank 12, density probe 74 monitoring the difference in the densities of water and oil/solids ladened froth and at a particular point in the accumulation, density probe 74 would activate valve 60, partially closing valve 60 and reducing the outlet flow of the effluent from tank 12. This reduction of outlet flow from tank 12 would then cause an accumulation of level within tank 12, as seen in FIG. 2B as indicated by arrows 78, and would tend to raise the fluid level up to point 80 at the top portion of trough 70, thereby concentrating the froth contaminants within trough 70. At this point, line 62 which is the exit line of trough 70 is provided with skim outlet valve 82 which is then opened, siphoning off all accumulation within trough 70, which is the oil and solid contaminant ladened froth contained in the trough. The removal of oil ladened skim in this manner eliminates the need of an external pump to evacuate the contaminants. Once this siphoning has taken place, outlet valve 82 is closed via activation by a second density probe 75, monitoring the drop in density present. The contaminants are then collected in tanks downstream of tank 12 for unrelated handling. Valve 60 is then re-opened, and the aeration process is resumed with the water level reduced and the accumulation of froth resumes once again.

As is seen in the FIGURES, there can be further provided in the process, a chemical feed unit 88, which is a standard feed unit for feeding a metered amount of a mixture of flocculant chemical 89, usually a polymer into flow line 14 in the initial treatment of the incoming contaminated water into tank 12 for achieving optimum separation of contaminants from the water. Also as seen in the FIGURES, there are plurality of monitoring gauges 90 and 92 along line 39 for monitoring the pressure within the system during the aeration process. There are also provided gauges 95, 96, 97 and 98, each positioned on eductor inlet 39 for indicating the gas flow within inlet 39 in CFM's. Also, each aeration chamber is provided with a manway 94 for access to the interior of each aeration chamber, with the manways in the normal position being in a firmly fluid/gas-tight seal during operation of the unit.

OPERATION OF THE SYSTEM

Having described the functioning components of the system, it may help to clarify the entire system by providing a detailed operation of the system itself. During the operation of the apparatus as seen in FIG. 1, flow line 14 introduces a flow of oil and/or solids contaminated water into the system for achieving a final clean effluent end product. There may be provided within line 14 a chemical injection means 88 for ejecting a metered amount of chemical flocculant 89 for helping to achieve a more efficient separation. Flow line 14 would allow flow into tank 12 via interior inlet line downcomer 16, the flow being directed toward the lower portion 17 of tank 12 as indicated by arrows 18. Inlet downcomer 16 would project into a first receiving chamber 11 separated from a first aeration chamber 20 by bulkhead partition 28 which would separate the froth and gas collected to the top portion 54 of tank 12 from the incoming influent to the tank.

As seen in FIG. 1, the influent would then lateral flow beneath first bulkhead partition 19 into first aeration chamber 20. Simultaneously, eductor means 35, located extruding into the bottom portion 13 of tank 12, would deliver a pressurized flow of fluid mixed with gas educted into the fluid flow, with the gas-entrained fluid moving upward through the primary fluid flow within first aeration cell 20 from inlet line 14. At this point, inlet flow would be at its most concentrated contaminant point, with the bubbles of gas moving upward through the primary fluid flow having collected a certain amount of the oil and solids contaminants via their adherence to the gas bubbles as they move upward in the flow. This main flow would then continue to move through each successive aeration chamber and receive the continuous upflow of gas educted fluid through chambers 20, 22, 24 and 26 and into the final quiescent chamber 33 for exiting through exit line 59.

At this point, in quiescent chamber 33, substantially all solid and oil particles should have been removed, including all bubbles, as not to create cavitation within recirculation pump 66 duriing the outflow of the effluent. During this process, the upflowing bubbles through the principal fluid flow would be liberated from the contaminants in the top portion 54 of tank 12 would then be induced through induction line 58 to be recirculated back into eductor means 35 to be reused in the process.

The collected oil and solids would tend to gather in a froth end top portion 54 and begin building up for collection through trough 70. In order to achieve this final collection, a density probe 74 would sense the level of contaminants in the system and would electrically or pneumatically partially close valve 60, thus blocking outflow from tank 12. This blockage of outflow would then create a buildup of fluid within tank 12, raising the entire fluid level as seen in FIGS. 2A and 2B, to a point where most if not all of the froth is collected within trough 70 and top portion 54 of the tank. At that point, skim outlet valve 82 would then be activated, siphoning all contents of trough 70 out of tank 12 for collection. Following the collection of the contents within trough 70, a second probe 75 would then reactivate valve 60, opening it fully and allowing the flow to continue out through valve 60 into flow line 62. Flow line 62 would divert to a second flow line 63, the second flow line 63 allowing clean effluent to be dumped from the system into surrounding waters with safe level of contaminants in the effluent. Flow line 62 would recirculate some of the fluid flow under pressure back into recirculation pump 66 for injection via line 50 into header 35 in order to educt gas flow into each aeration chamber for further operation of the system.

It should be noted that in this particular system, tank 12 as stated earlier, is a cylindrically-shaped tank with rounded end portions for achieving a maximum ability to withstand internal pressure. This is necessary in view of the fact that often times fluid flow within line 14 may exceed certain limits, and due to the sometime noxious or harmful gases within the system, could cause a rupture in a standardly designed tank, and thus create a hazard on a rig or platform. Also, tank 12 and its related exterior piping system allows for the maximum use of space which is crucial on a rig floor, in achieving the desired result of obtaining clean effluent in the system. Also, in the operation, tank 12 is able to flow a quantity of fluid therethrough in a period of approximately 4 minutes, thereby achieving a great flow of fluid in the cleaning process. Unlike the prior art, this tank requires no paddle wheel skimmers, which are mechanically operated and therefore high maintenance and expensive to run. In addition, due to its unique use of the V-shaped channel, thus eliminating the necessity for skimmers, the fluid contained within main tank 12 is of a greater volume, and thus can produce a greater fluid flow therethrough, with a smaller tank than the present state of the art. Also, the unit is shorter in length than the present state of the art, fabrication costs are substantially less than the present state of the art, and the unit can be easily modulized resulting in multiple variations in size versus the total flow.

Because many varying and different embodiments may be made within the scope of the inventive concept herein taught, and because many modifications may be made in the embodiments herein detailed in accordance with the descriptive requirement of the law, it is to be understood that the details herein are to be interpreted as illustrative and not in a limiting sense.

What is claimed as invention is:

1. An upflow separator apparatus for treating a contaminated liquid stream comprising:
   a. a substantially cylindrical, gas tight fluid flow chamber, defining a lower liquid flow portion and an upper gas collection portion;
   b. means for introducing a first flow of contaminated liquid into said liquid portion of said chamber;
   c. an outlet line for flowing clarified liquid from said chamber;
   d. baffle means dividing said chamber into a plurality of aeration chambers, said chambers in fluid flow communication with one another;
   e. means for educting gas through said contaminated liquid in each of said aeration chambers, comprising:
      i. a clarified liquid inlet line;
      ii. a gas inlet line, said gas being educted into said eductor means by the flow of clarified liquid in said liquid line;
      iii. header means, further comprising first and second spaced apart plate members emitting a mixture of said educted gas and liquid therebetween for achieving maximum upward dispersion of gas bubbles through the contaminated liquid in each of said aeration chambers; and
      iv. said means for educting gas protruding from the floor portion of each of said aeration chambers;
   f. a single channel extending substantially the length of said gas collection portion transverse said baffle means for receiving and collecting contaminants removed from said liquid portion into said gas collection portion;
   g. means for recirculating said gas collected within said upper gas collection portion by normal eduction, comprising a gas flow line in fluid communication with said upper gas collection portion and said means for educting gas into said liquid flow;
   h. means in fluid communication with said channel for siphoning said contaminants from said channel as a result of a predetermined signal; and
   i. means for recirculating a portion of clarified liquid from said outlet line back into said chamber through said educting means.

2. The apparatus of claim 1 further comprising contaminant density monitoring means for generating said predetermined signal and for activating a valve for allowing said fluid level in said chamber to be raised in response to said predetermined signal.

3. The apparatus of claim 1, wherein said channel for collecting contaminants within said gas collection portion of said chamber further comprises an elongated V-shaped channel wherein said contaminants reside prior to removal.

4. A method for separating oil and gas contaminants from water, which comprises the following steps:
   a. providing a cylindrical, gas tight main fluid chamber said chamber defining a lower fluid flow portion and an upper gas containing portion;
   b. dividing said fluid chamber into at least two aeration portions in fluid communication therebetween;
   c. injecting a first flow of contaminated water into said main fluid chamber;
   d. flowing said contaminated water through said first and second aeration portions;
   e. providing gas educting means in each of said aeration portions;
   f. simultaneously providing a second fluid flow through said gas educting means for educting gas upward into each of said aeration portions for moving said contaminants from the water flow;
   g. providing a single contaminant collection channel extending substantially the length of said chamber above the water level in said fluid chamber;
   h. increasing the water level in said fluid chamber to a level adjacent said contaminant collection channel, forcing said contaminants upwards along the wall of said cylindrical chamber toward said channel;
   i. collecting said contaminants in said contaminant collection channel;
   j. siphoning said collected contaminants in the top portion of said chamber;
   k. flowing contaminant-free water out of said chamber following the aeration process; and
   l. circulating said educted gas from each of said aeration chambers during said process.

5. The method of claim 4, wherein said water flowing into said first portion is educting said gas into each of said aeration portions.

* * * * *